Nov. 27, 1956

O. A. SAHLBOM 2,771,829

ROTARY CULTIVATOR

Filed Feb. 18, 1954

Olaf A. Sahlbom
INVENTOR.

BY Clarence A. O'Brien
and Harvey B. Jacobson
Attorneys

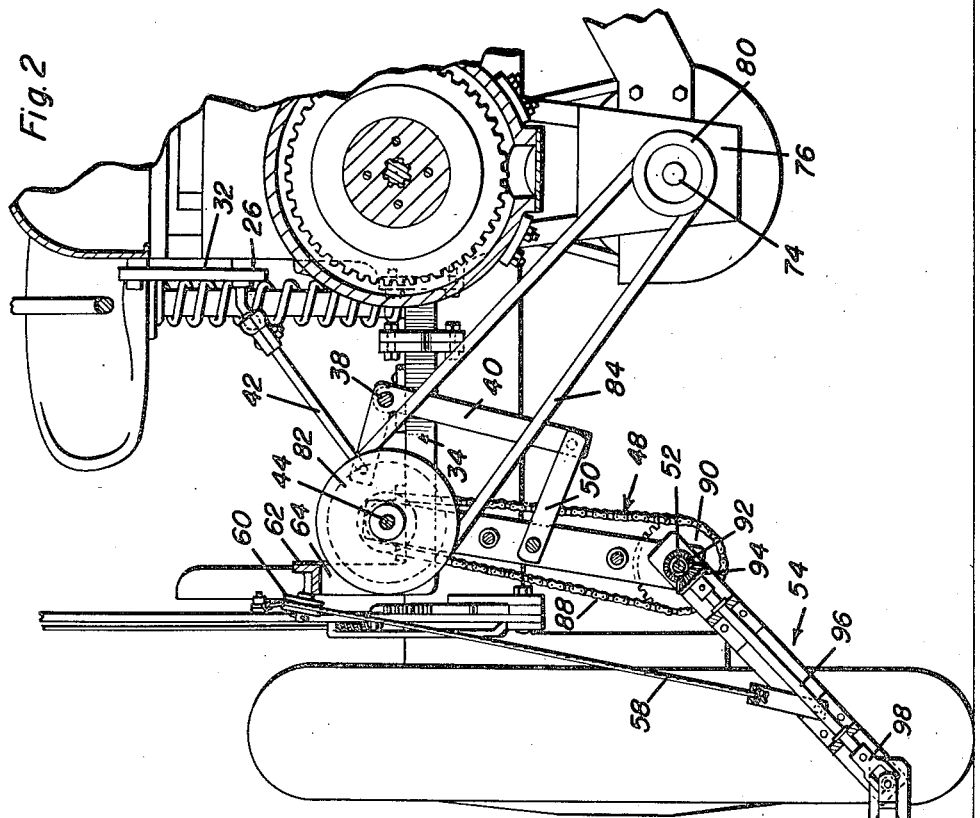
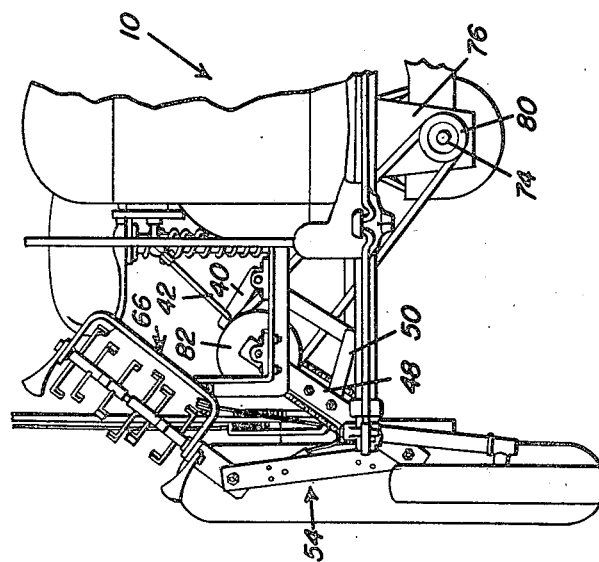
Olaf A. Sahlbom
INVENTOR.

Nov. 27, 1956

O. A. SAHLBOM 2,771,829

ROTARY CULTIVATOR

Filed Feb. 18, 1954

Olaf A. Sahlbom
INVENTOR.

BY *James A O'Brien*
*and Harvey B. Jacobson*
Attorneys

Patented Nov. 27, 1956

2,771,829
ROTARY CULTIVATOR

Olaf A. Sahlbom, Lake Stevens, Wash., assignor of fifty percent to Lee J. Bogart, Granite Falls, Wash.

Application February 18, 1954, Serial No. 411,099

1 Claim. (Cl. 97—40)

This invention relates generally to tilling mechanisms and pertains more particularly to a power driven tiller adapted to be attached to a tractor and driven by the power take-off thereof, the assembly being disposed laterally of the tractor so as to be under the observation of the operator at all times and being both laterally and vertically movable whereby an operator may manipulate the tiller in and between rows of crops.

A primary object of this invention is to provide a tiller in conformity with the foregoing objects wherein the combined lateral and vertical movement of the tiller head is effected by means of a series of pivotally interconnected units constrained in their movement by mechanisms and linkages under the control of an operator of the tractor to which the assembly is attached.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an enlarged vertical section taken substantially along the plane of section line 2—2 in Figure 1;

Figure 5 is a view similar to Figure 2, but showing the tiller in transporting position.

Figure 1:
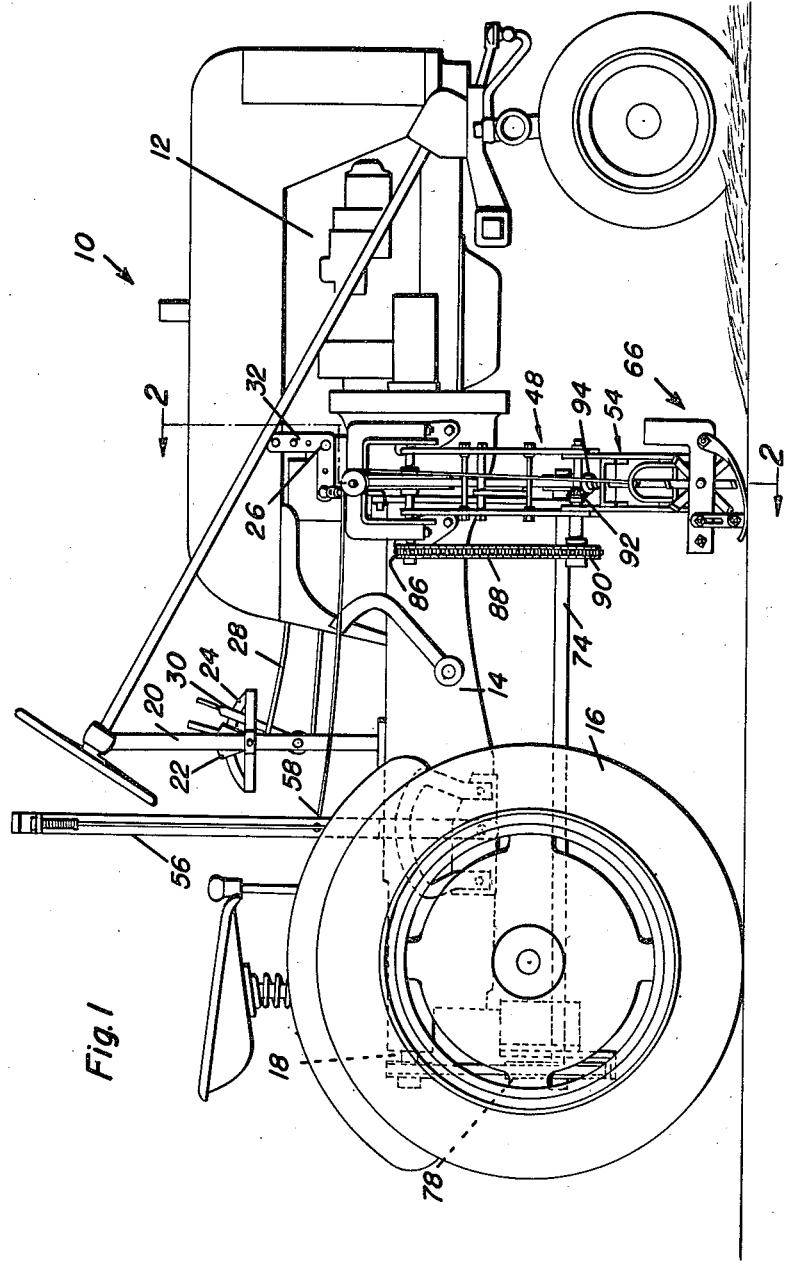
Figure 1 is a side elevation of a tractor with tiller attachment.

Referring now more particularly to the drawings in detail and particularly Figure 1 thereof, reference numeral 10 indicates a conventional tractor generally which employs the usual power plant 12, the body section 14 housing the power train which drives the rear wheels 16 and which furnishes power to the power take-off shaft 18. The tractor also employs a steering shaft standard 20 to which both the throttle control sector 22 and the cross shaft sector 24 are attached. In reference to the latter, the cross shaft is designated by reference numeral 26 and receives its usual oscillatory motion by way of a drag link 28 connected to the lever 30 associated with the cross shaft sector 24. The usual bellcrank 32 is attached to the right hand end of the cross shaft, as shown.

Figure 3:
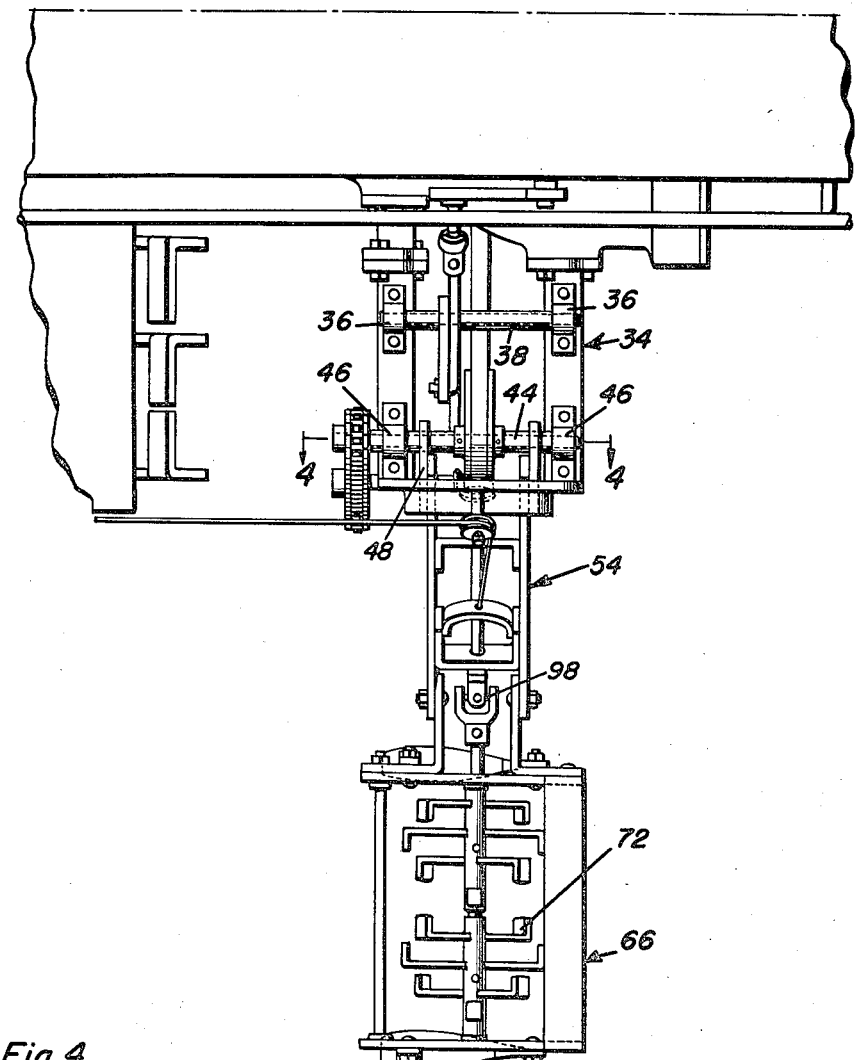
Figure 3 is a plan view of the tiller assembly.
Figure 4:
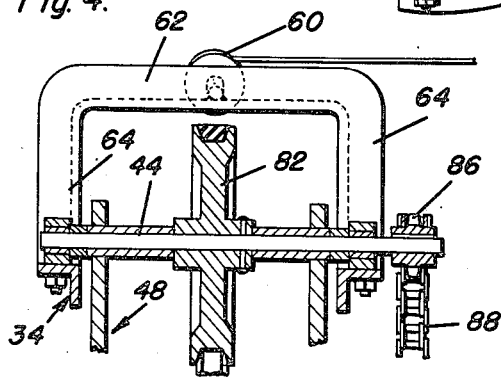
Figure 4 is an enlarged vertical section taken along the plane of section line 4—4 in Figure 3.

As seen more clearly in Figure 3, a supporting frame 34 is secured to one side of the tractor and journals thereon, by means of suitable pillow blocks 36 or the like, a pivot shaft 38. An L-shaped idler crank 40 is secured to this shaft and one end is connected to bellcrank 32 by rod 42, the connection between the rod and the two cranks being in the nature of universal joints.

The frame 34 also journals a drive shaft 44 by the bearing blocks 46 and this shaft, in turn, provides a pivotal connection between the frame and the upper carriage 48. The lower end of the previously mentioned idler crank 40 connects with the upper carriage through the link 50 such that as the tractor operator manipulates the lever 30, carriage 48 will be swung about its pivot, the drive shaft 44.

An intermediate drive shaft 52 is journaled at the lower end of carriage 48 and this shaft provides the pivotal connection between the upper carriage and the lower carriage 54. An operating lever 56 on the tractor is secured to one end of a cable element 58 while the other end thereof connects to the lower carriage such that manipulation of the lever effects swinging to the lower carriage about intermediate drive shaft 52. The cable is, of course, trained over a suitable pulley 60 mounted on a cross bar 62 between uprights 64 of frame 34.

A tiller head assembly 66 is rigidly secured to the free end of the lower carriage and incorporates a framework having depth gauging shoes 68 depending therefrom and journaling the tiller shaft 70 to which replaceable tiller blades 72 radiate.

For the purpose of driving the tiller, a shaft 74 is suitably journaled longitudinally of and beneath the tractor as by the hangers 76, this shaft being provided at opposite ends with pulley members 78 and 80 for belt connection to the power take-off shaft 18 and the drive shaft 44, respectively. The pulley 82 on drive shaft 44 and belt 84 complete the latter connection and the drive shaft is further provided with a sprocket 86 at one end over which a chain 88 is trained. Intermediate drive shaft 52 has a sprocket 90 coinciding therewith and medially carries a miter gear 92 meshing with miter gear 94 on final drive shaft 96 which is, in turn, connected at its remote end to tiller shaft 70 through the universal joint 98.

Thus, an operator may, by simultaneous or independent movement of the levers 20 and 56, effect lateral or vertical movement of the tiller head 66 to cultivate in and between crop rows, as desired.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A tilling attachment for a tractor comprising a frame attachable to one side of a tractor to extend horizontally outwardly therefrom, a first cross shaft journaled in said frame and adapted to be connected to a power take-off of a tractor for drive by said power take-off, an upper elongated carriage pivoted on and suspended from said cross shaft for vertical swinging transversely of the tractor and having a second cross shaft journaled therein below said first cross shaft, driving connections from the first to the second cross shafts, a lower elongated carriage depending from the second cross shaft and swingable upwardly and downwardly thereon and vertically with the first carriage, an elongated tilling head extending outwardly from the lower end of the second carriage for vertical swinging thereby and having a rotary operating shaft at an angle to the lower carriage, a drive shaft journaled in the lower carriage and having its axis coplanar therewith, said drive shaft being universally jointed to the operating shaft, gearing between the first cross shaft and the drive shaft, and levers pivotally attachable to a tractor and operatively connected to said carriages, respectively, for swinging said carriages independently.

References Cited in the file of this patent

UNITED STATES PATENTS

| | | |
|---|---|---|
| 2,291,987 | Rogers | Aug. 4, 1942 |
| 2,494,271 | Turner et al. | Jan. 10, 1950 |
| 2,552,710 | Dodson | May 15, 1951 |
| 2,564,876 | Brown | Aug. 21, 1951 |
| 2,665,621 | Smith et al. | Jan. 12, 1954 |

FOREIGN PATENTS

| | | |
|---|---|---|
| 663,494 | Great Britain | Dec. 19, 1951 |